United States Patent
Zhang et al.

(10) Patent No.: US 11,843,572 B2
(45) Date of Patent: Dec. 12, 2023

(54) SYSTEMS AND METHODS FOR INTELLIGENT MESSAGING

(71) Applicant: Citrix Systems, Inc., Fort Lauderdale, FL (US)

(72) Inventors: Wenshuang Zhang, Nanjing (CN); Xuan Liu, Nanjing (CN); Zongpeng Qiao, Nanjing (CN); Ke Xu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/648,016

(22) Filed: Jan. 14, 2022

(65) Prior Publication Data

US 2023/0179560 A1 Jun. 8, 2023

Related U.S. Application Data

(63) Continuation of application No. PCT/CN2021/136316, filed on Dec. 8, 2021.

(51) Int. Cl.
*H04L 51/42* (2022.01)

(52) U.S. Cl.
CPC .................... *H04L 51/42* (2022.05)

(58) Field of Classification Search
CPC ..... G06Q 10/1095; H04L 51/02; H04L 12/18; H04L 29/06; H04L 12/1813; H04L 29/08; H04L 51/42
See application file for complete search history.

(56) References Cited

U.S. PATENT DOCUMENTS

| | | | |
|---|---|---|---|
| 9,577,966 B1* | 2/2017 | Dorsey | H04L 51/04 |
| 10,817,782 B1* | 10/2020 | Rando | G06F 40/295 |
| 11,552,919 B1* | 1/2023 | Shah | H04L 51/216 |
| 2005/0216328 A1 | 9/2005 | Clark | |

(Continued)

FOREIGN PATENT DOCUMENTS

| | | |
|---|---|---|
| CN | 101155049 A | 4/2008 |
| CN | 102385615 A | 3/2012 |

(Continued)

OTHER PUBLICATIONS

International Search Report and Written Opinion for App. No. PCT/CN2021/085878, dated Jan. 4, 2022, 10 pages.

(Continued)

*Primary Examiner* — Sargon N Nano

(57) ABSTRACT

In one aspect, an example methodology implementing the disclosed techniques can include, by a computing device, responsive to a request for information regarding messages associated with a user and another user, a message associated with the user and the another user, the message sent or received via an application from a plurality of applications. The method can also include, by the computing device, identifying one or more other messages associated with the user and the another user based on metadata of the message, at least one of the one or more other messages sent or received via another application of the plurality of applications, the another application being different than the application. The method can further include, by the computing device, outputting information regarding the one or more other messages.

14 Claims, 13 Drawing Sheets

(56) References Cited

U.S. PATENT DOCUMENTS

| | | | |
|---|---|---|---|
| 2007/0192318 A1* | 8/2007 | Ramer | G06F 16/9535 |
| 2007/0244879 A1 | 10/2007 | Clausner | |
| 2008/0313004 A1 | 12/2008 | Ryan | |
| 2010/0058202 A1* | 3/2010 | Rostom | G06F 16/951 |
| | | | 707/E17.108 |
| 2013/0097491 A1 | 4/2013 | Shoya | |
| 2014/0324982 A1* | 10/2014 | Agrawal | H04L 51/216 |
| | | | 709/206 |
| 2014/0344718 A1* | 11/2014 | Rapaport | H04L 51/52 |
| | | | 715/753 |
| 2015/0121281 A1* | 4/2015 | Sihn | H04M 1/00 |
| | | | 715/772 |
| 2015/0142800 A1 | 5/2015 | Thapliyal | |
| 2015/0169788 A1* | 6/2015 | Doganata | G06T 19/00 |
| | | | 707/798 |
| 2015/0170092 A1* | 6/2015 | Klein | G06Q 10/06398 |
| | | | 705/7.42 |
| 2015/0220888 A1* | 8/2015 | Iyer | G06Q 10/1095 |
| | | | 705/7.19 |
| 2016/0329050 A1* | 11/2016 | Godewyn | H04M 3/42221 |
| 2017/0278038 A1 | 9/2017 | Wu | |
| 2017/0329745 A1* | 11/2017 | Sharifi | G06Q 10/107 |
| 2018/0018610 A1 | 1/2018 | Del Balso | |
| 2018/0287987 A1 | 10/2018 | Purian | |
| 2019/0258985 A1 | 8/2019 | Daniek | |
| 2020/0257850 A1* | 8/2020 | Carbune | G06F 16/93 |
| 2021/0019713 A1 | 1/2021 | Vangala | |
| 2021/0073712 A1 | 3/2021 | Fox | |
| 2021/0109744 A1 | 4/2021 | Hegde | |
| 2022/0014543 A1* | 1/2022 | Jakobsson | H04L 63/1425 |
| 2022/0067510 A1* | 3/2022 | Jayakumar | G06F 16/2474 |
| 2022/0294752 A1* | 9/2022 | Shelke | H04L 51/216 |
| 2022/0385603 A1* | 12/2022 | Aher | H04L 51/046 |

FOREIGN PATENT DOCUMENTS

| | | |
|---|---|---|
| CN | 102685130 A | 9/2012 |
| CN | 102685227 A | 9/2012 |
| CN | 103186847 A | 7/2013 |
| CN | 103327087 A | 9/2013 |
| CN | 108027738 A | 5/2018 |
| CN | 108391079 A | 8/2018 |
| CN | 109074555 A | 12/2018 |
| CN | 111125086 A | 5/2020 |
| WO | 2013095755 A2 | 6/2013 |

OTHER PUBLICATIONS

International Search Report and Written Opinion issued in App. No. PCT/CN2021/136316, dated Sep. 14, 2022, 10 pages.

International Search Report and Written Opinion issued in App. No. PCT/CN2021/136681, dated Sep. 7, 2022, 9 pages.

International Search Report and Written Opinion issued in App. No. PCT/CN2021/136954, dated Aug. 25, 2022, 9 pages.

International Search Report and Written Opinion issued in App. No. PCT/CN2021/118120, dated Jun. 10, 2022, 9 pages.

International Search Report and Written Opinion issued in App. No. PCT/CN2022/070451, dated Oct. 10, 2022, 10 pages.

* cited by examiner

SYSTEMS AND METHODS FOR INTELLIGENT MESSAGING

CROSS REFERENCE TO RELATED APPLICATIONS

This application is a continuation of and claims the benefit of PCT Patent Application No. PCT/CN2021/136316 filed on Dec. 8, 2021 in the English language in the State Intellectual Property Office and designating the United States, the contents of which are hereby incorporated herein by reference in its entirety.

BACKGROUND

Organizations continue to be reliant on electronic messaging, such as email and text messaging, as a mode of communication. For example, within a company, email is being used as a powerful marketing tool. Also, employees continue to send countless number of emails to colleagues, customers, potential customers, suppliers, among others, in the course of performing their jobs. Text messaging, such as Short Message Service (SMS) messaging, is also increasingly being used by employees to communicate within and outside the company.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

It is appreciated herein that there are scenarios where contextually relevant messages may need to be located. For example, an employee may receive an email from another employee without any context (e.g., "Hi, are you available for a quick chat?"). Here, the employee may feel lost as to the subject or topic of the discussion as this may be the first email between the two employees. However, the employee may vaguely recall that the employees may have previously communicated over a different messaging mode, such as SLACK, but cannot clearly remember the topic that was discussed. Here, it may be difficult and/or time consuming for the employee to locate and search through the employee's messages (e.g., SLACK messages) to locate the messages between the two employees.

As another example, an employee may receive an email(s) discussing a specific topic (e.g., a project within the company) form another employee. Subsequently, the employee may receive another message over a different messaging mode, such as SMS, inquiring about the topic discussed in the email from the other employee. Unfortunately, the employee may not be able to respond to the inquiry (i.e., the SMS message) without the subject matter (i.e., context) from the email(s) on the same topic between the two employees. Here, similar to the scenario discussed above, it may be difficult and/or time consuming for the employee to locate and search through the employee's messages (e.g., emails) to locate the messages between the two employees that discuss the specific topic at issue.

As still another example, an employee may need to discuss (e.g., need information) a specific project and post a message to an appropriate discussion group (e.g., a SLACK channel) in the company. Here, the employee may have preferred to communicate directly with a specific person in the discussion group but was unable to recall whether he or she had previously communicated with anyone in the discussion group. More generally, as illustrated by the examples above, in many instances when communicating, an employee may greatly benefit from information which allows the employee to determine a context, such as, for example, a reason for a message, a relationship of a message to other messages, a topic related to a message, a target user to whom a message should be directed, among others. Embodiments of the present disclosure provide solutions to these and other technical problems described herein.

The present disclosure relates to concepts, devices, systems, methods and techniques for automatically collecting information regarding messages and, from the collected information, presenting information regarding messages associated with a user in an organized, accessible manner, thereby allowing the user to quickly and easily determine a context of a message associated with the user (e.g., a new message received or sent by the user). Information regarding messages can be automatically collected from various data sources. Then, for a message associated with a user (e.g., a new message associated with the user), the collected messaging information can be analyzed to determine which messaging information is relevant to the message. The relevant messaging information can be presented to the user as contextual cues to assist the user in determining the context of the message associated with the user. The concepts and techniques described herein can be used to improve the efficiency and utility of existing computer systems and applications, such as existing applications that provide a form of messaging (e.g., WRIKE, JIRA, SLACK, TEAMS, ZOOM, and OUTLOOK, among others).

In accordance with one example embodiment provided to illustrate the broader concepts, systems, and techniques described herein, a method includes, by a computing device, responsive to a request for information regarding messages associated with a user and another user, a message associated with the user and the another user, the message sent or received via an application from a plurality of applications. The method also includes, by the computing device, identifying one or more other messages associated with the user and the another user based on metadata of the message, at least one of the one or more other messages sent or received via another application of the plurality of applications, the another application being different than the application. The method further includes, by the computing device, outputting information regarding the one or more other messages.

According to another illustrative embodiment provided to illustrate the broader concepts described herein, a system includes a processor and a non-volatile memory storing computer program code. The computer program code, when executed on the processor, causes the processor to execute a process operable to, responsive to a request for information regarding messages associated with a user and another user, identify a message associated with the user and the another user, the message sent or received via an application from a plurality of applications. The process is also operable to identify one or more other messages associated with the user and the another user based on metadata of the message, at least one of the one or more other messages sent or received via another application of the plurality of applications, the another application being different than the application. The process is further operable to output information regarding the one or more other messages.

According to another illustrative embodiment provided to illustrate the broader concepts described herein, a method includes, by a first computing device, receiving information regarding a message associated with a user, the message sent or received via an application from a plurality of applications. The method also includes, by the first computing device, identifying one or more other messages associated with the user and that are relevant to the message, at least one of the one or more other messages sent or received via another application of the plurality of applications, the another application being different than the application. The method further includes, by the first computing device, sending information regarding the one or more other messages associated with the user and that are relevant to the message to a second computing device, the second computing device configured to display the information regarding the one or more other messages associated with the user and that are relevant to the message.

According to another illustrative embodiment provided to illustrate the broader concepts described herein, a system includes a processor and a non-volatile memory storing computer program code. The computer program code, when executed on the processor, causes the processor to execute a process operable to receive information regarding a message associated with a user, the message sent or received via an application from a plurality of applications. The process is also operable to identify one or more other messages associated with the user and that are relevant to the message, at least one of the one or more other messages sent or received via another application of the plurality of applications, the another application being different than the application. The process is further operable to send information regarding the one or more other messages associated with the user and that are relevant to the message to another computing device, the another computing device configured to display the information regarding the one or more other messages associated with the user and that are relevant to the message.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
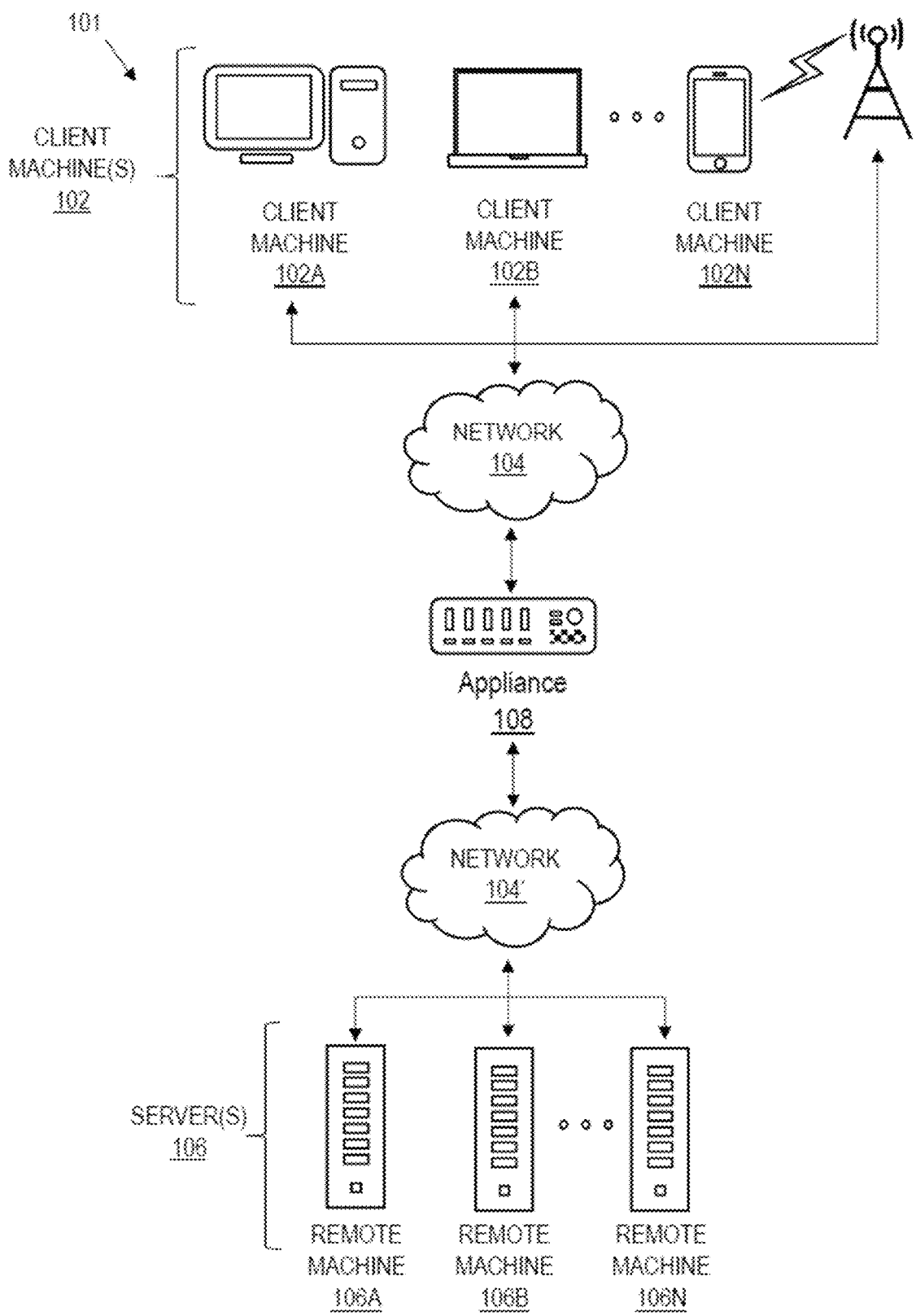
FIG. 1 is a diagram of an illustrative network computing environment in which embodiments of the present disclosure may be implemented.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
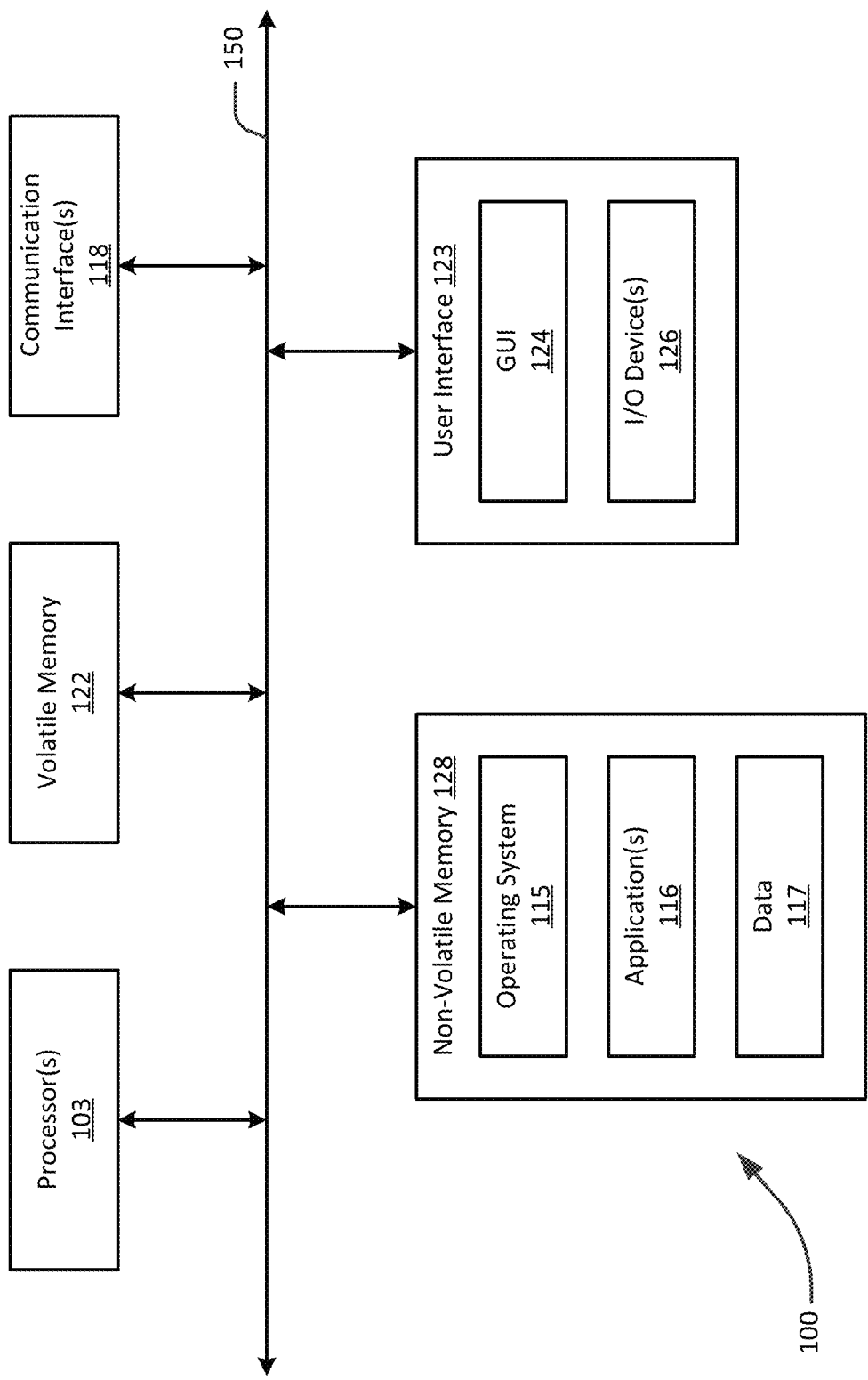
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
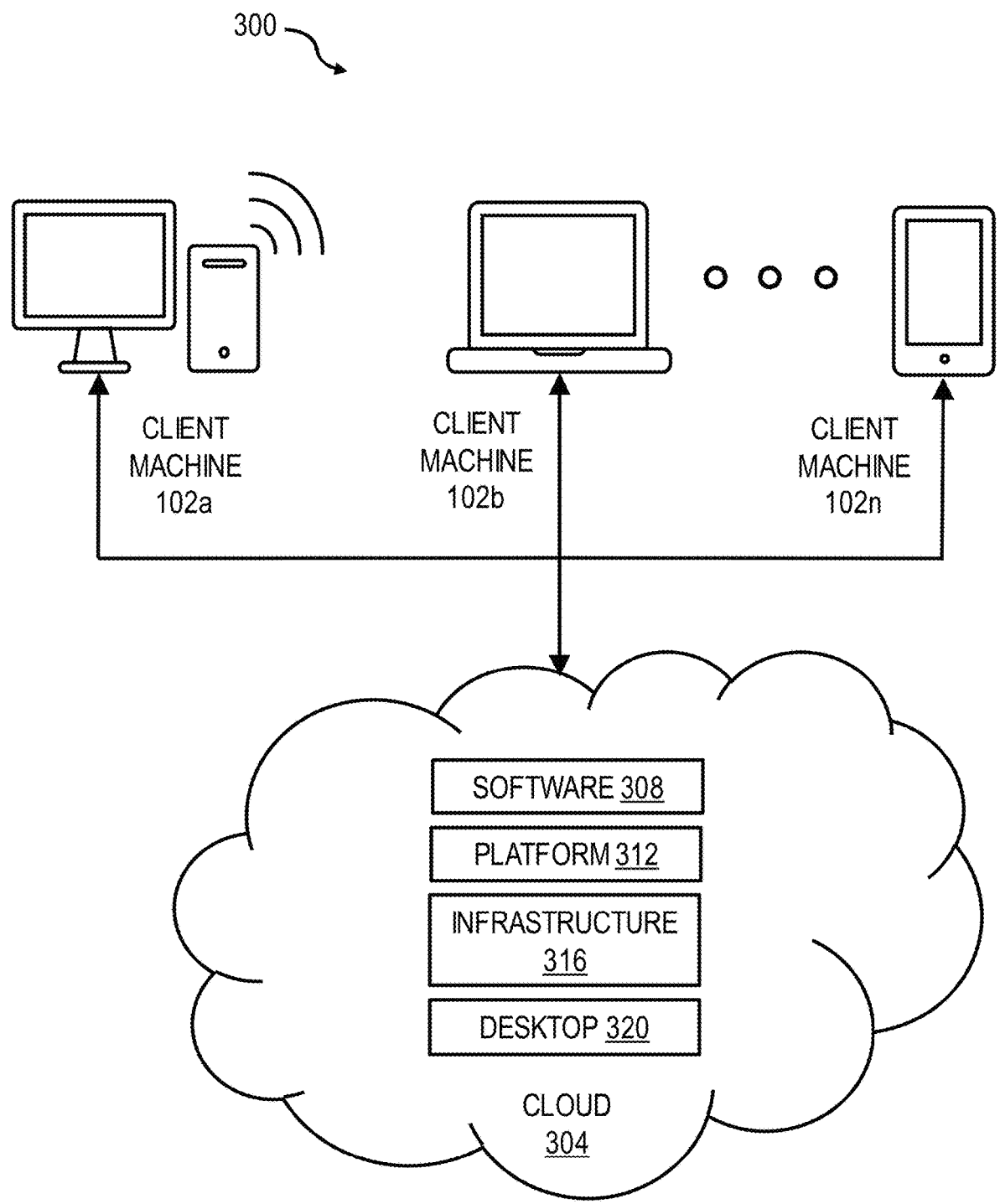
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g., Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
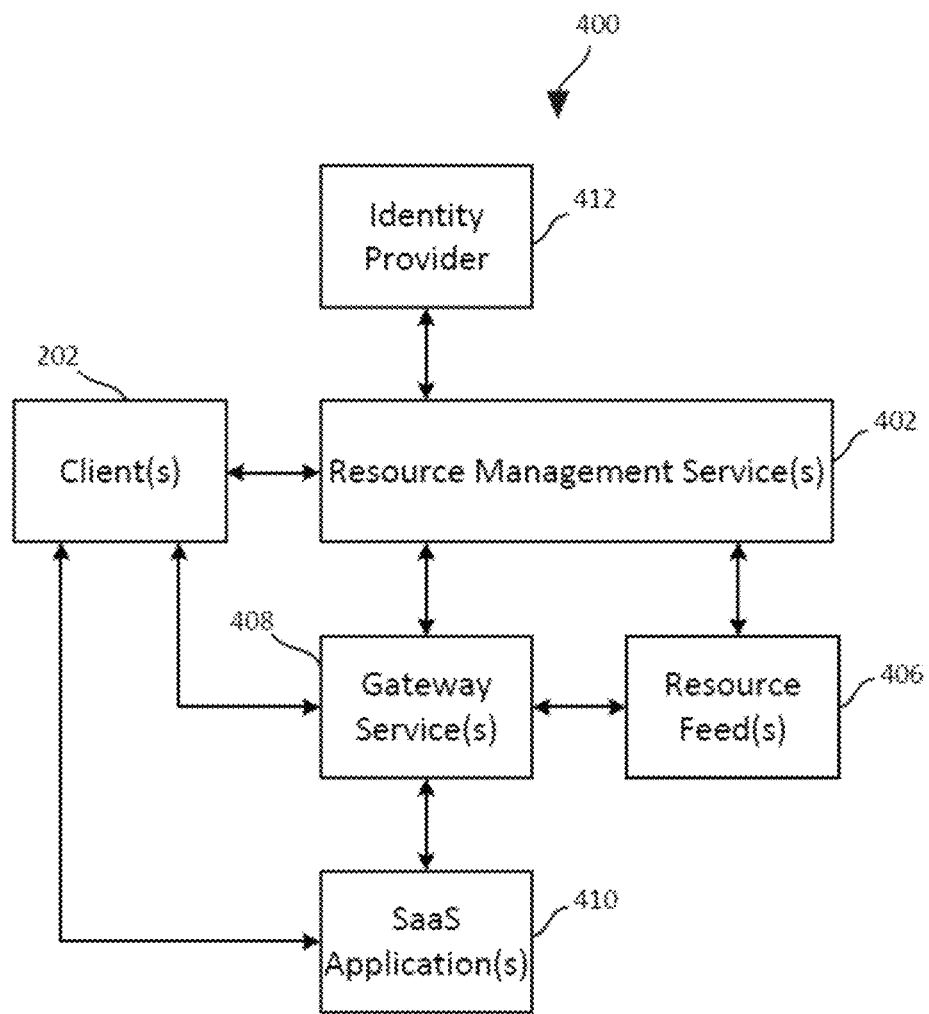
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
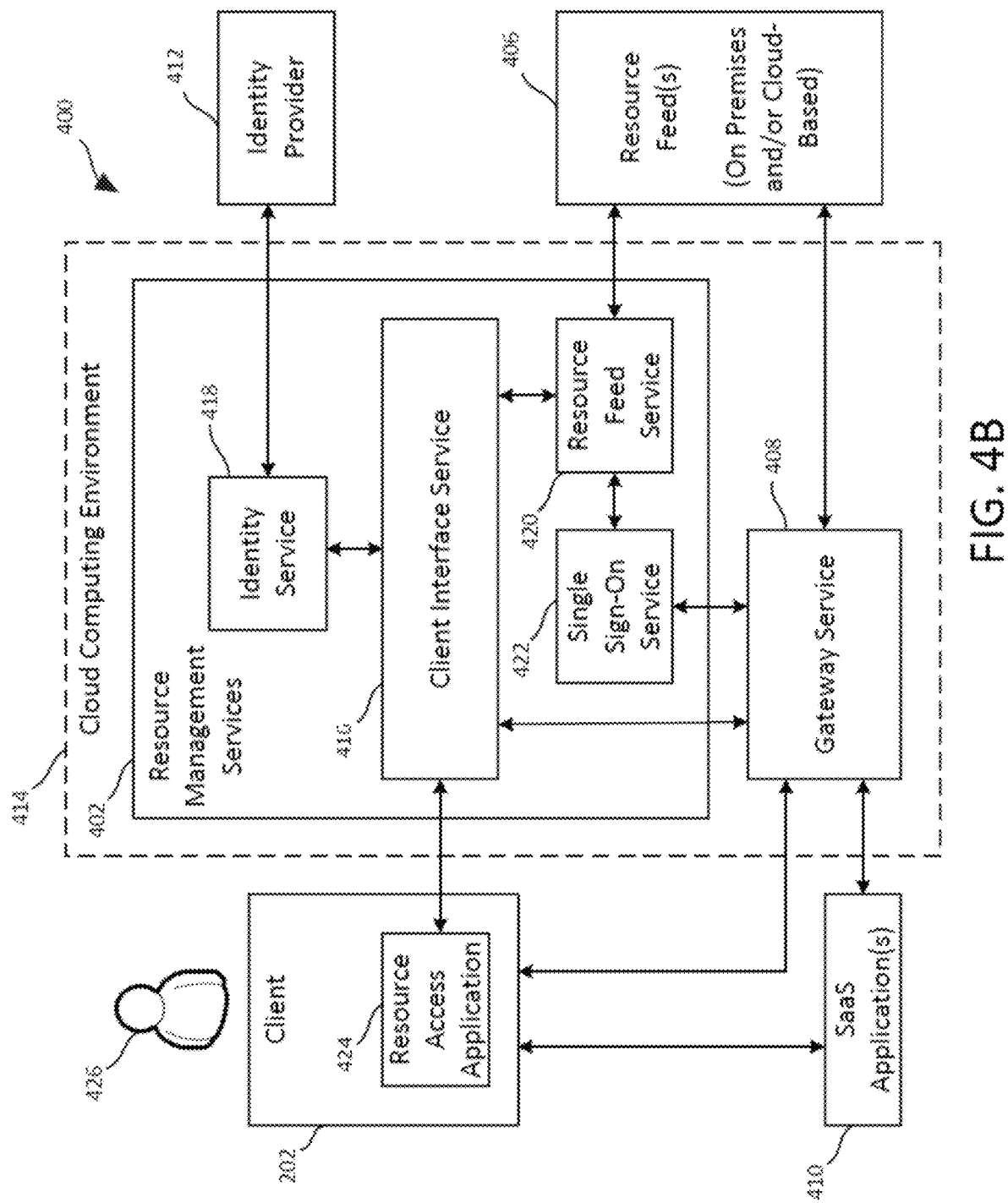
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link.

For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
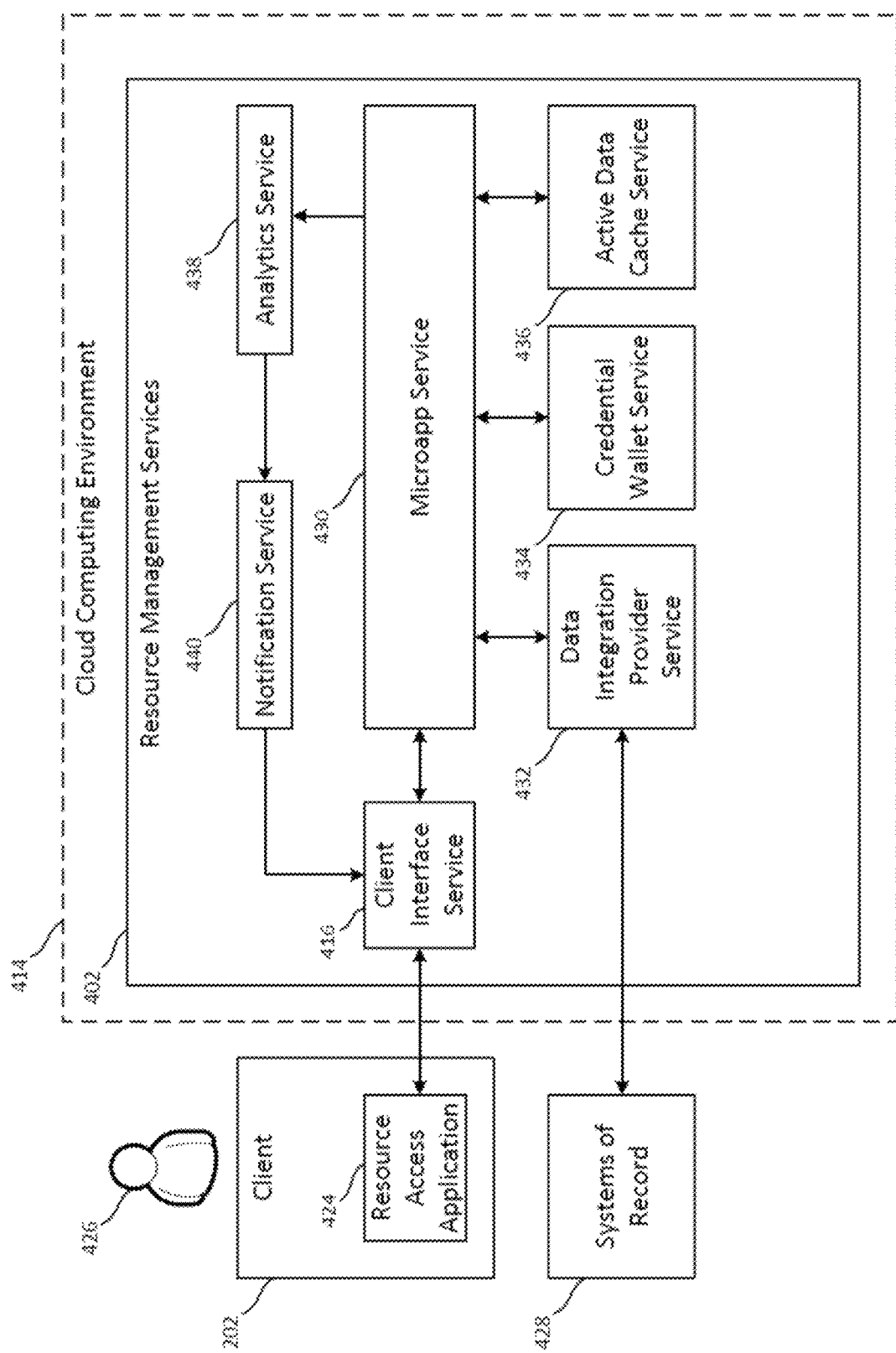
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6 ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
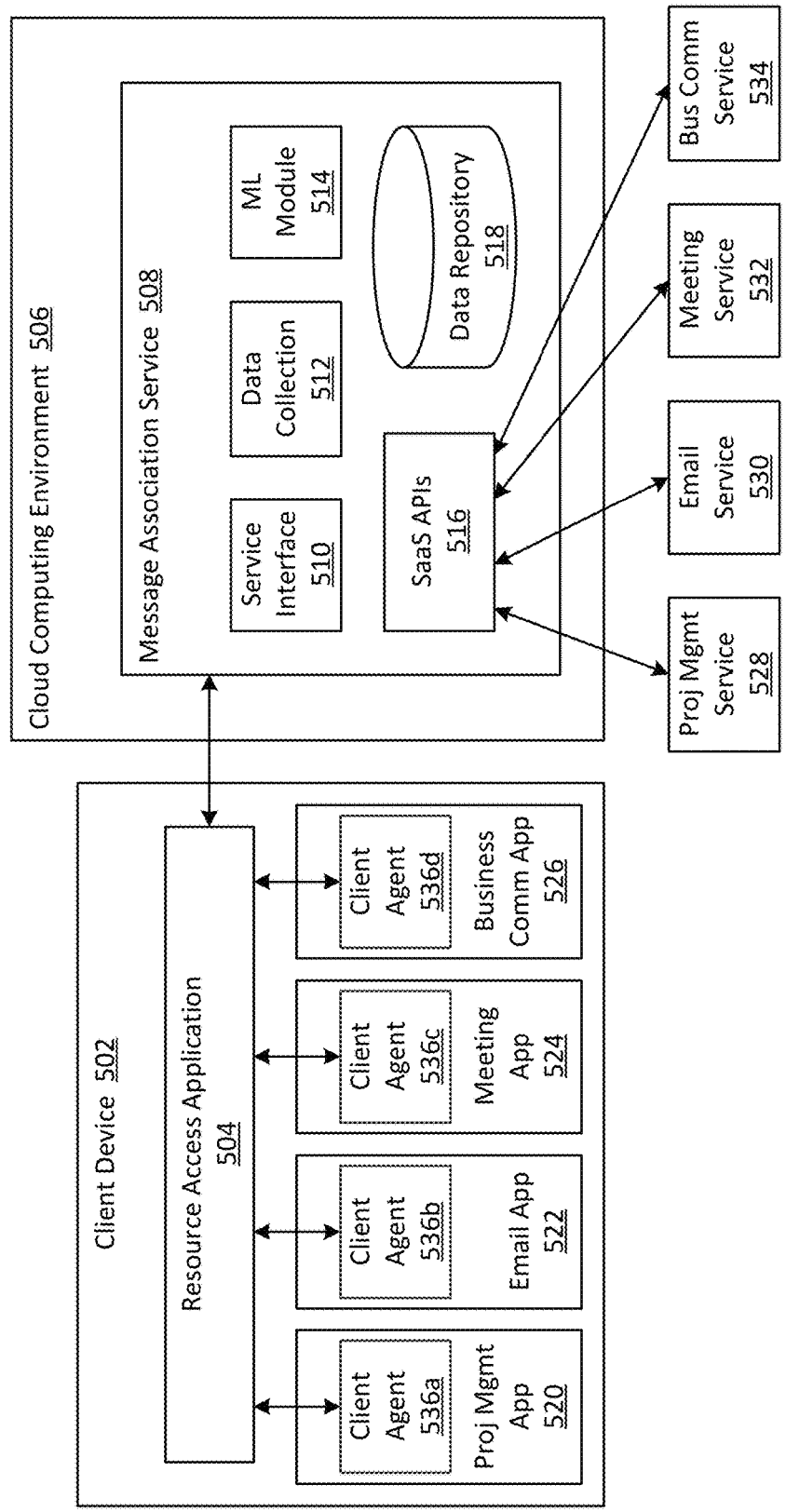
FIG. 5 is a block diagram of an illustrative system for intelligent messaging, in accordance with an embodiment of the present disclosure.

FIG. 5 is a block diagram of an illustrative system 500 for intelligent messaging, in accordance with an embodiment of the present disclosure. System 500 includes a resource access application 504 installed on a client device 502 and configured to communicate with a cloud computing environment 506. Client device 502, resource access application 504, and cloud computing environment 506 of FIG. 5 can be the same as or similar to client 202, resource access application 424, and cloud computing environment 414, respectively, of FIGS. 4A-4C.

Cloud computing environment 506 can include a message association service 508. In some embodiments, message association service 508 can be provided as a service (e.g., a microservice) within cloud clouding environment 506. Message association service 508 can be logically and/or physically organized into one or more components. In the example of FIG. 5, message association service 508 includes a service interface module, 510, a data collection module 512, a machine learning (ML) module 514, one or more SaaS application programming interface (API) modules 516, and a data repository 518.

In addition to resource access application 504, various other applications can be installed on client device 502, such as a project management application 520, an email application 522, a meeting application 524, and a business communication application 526. Project management application 520, email application 522, meeting application 524, business communication application 526 can communicate with a project management service 528, an email service 530, a meeting service 532, and a business communication service 534, respectively. For example, applications 520, 522, 524, 526 can communicate with respective service 528, 530, 532, 534 via resource access application 504 and message association service 508. In some embodiments, project management application 520 and project management service 528 may correspond to, for example, JIRA, WRIKE, BASECAMP, TRELLO, or other suitable product/project management application and service. Email application 522 and email service 530 may correspond to, for example, OUTLOOK or other suitable email application and service. Meeting application 524 and meeting service 532 may correspond to, for example, TEAMS, ZOOM, GOTOMEETING, or other suitable online meeting application and service. Business communication application 526 and business communication service 534 may, for example, correspond to SLACK or other suitable business collaboration/communication application and service. In some embodiments, applications 520, 522, 524, and/or 526 can access services 528, 530, 532, and/or 534 using a single sign-on service (e.g., service 422 of FIG. 4B).

Project management application 520 can include a UI, including UI controls, to enable a user to access project management service 528. Similarly, email application 522 can include a UI, including UI controls, to enable a user to access email service 530, meeting application 524 can include a UI, including UI controls, to enable a user to access meeting service 532, and business communication application 526 can include a UI, including UI controls, to enable a user to access business communication service 534.

As can be seen in FIG. 5, a client agent 536a can be provided as a sub-module or other component of project management application 520, a client agent 536b can be provided as a sub-module or other component of email application 522, a client agent 536c can be provided as a sub-module or other component of meeting application 524, and a client agent 536d can be provided as a sub-module or other component of business communication application 526. The respective client agents 536a-536d (individually referred to herein as client agent 536 or collectively referred to herein as client agents 536), resource access application 504, and message association service 508 can interoperate to present information regarding messages that are associated with a user of resource access application 504. For example, information regarding messages associated with a user can be presented in an organized, accessible manner to provide contextual cues to assist the user in determining the context of other messages associated with the user.

To promote clarity in the drawings, FIG. 5 shows a single resource access application 504 communicably coupled to message association service 508. However, embodiments of message association service 508 can be used to service many resource access applications 504 used by many different users associated with one or more organizations. Resource access application 504, client agents 536, and/or message association service 508 may be implemented as computer instructions executable to perform the corresponding functions disclosed herein.

The client-side resource access application 504 can communicate with cloud-side message association service 508. For example, resource access application 504 can send requests (or "messages") to message association service 508 wherein the requests are received and processed by service interface module 510. Likewise, message association service 508 can utilize service interface module 510 to send responses/messages to resource access application 504 wherein the responses are received and processed by resource access application 504.

Referring to message association service 508, data collection module 512 is operable to collect or otherwise retrieve information regarding messages from services 528, 530, 532, and/or 534. Many different types of applications and services, such as services 528, 530, 532, 534, allow users to send and receive messages. In general, a message can include content, such as text and images, along with metadata such as a sender of the message, a recipient(s) of the message, a timestamp indicating when the message was sent/received, and a read status (or "flag") indicating whether or not the message has been read by the recipient. A message may also include attachments, such as files and documents, or links to such materials.

In some embodiments, data collection module 512 is operable to collect or otherwise retrieve information regarding messages (sometimes referred to herein more simply as "messaging information") from one or more project management services (e.g., project management service 528), one or more email services (e.g., email service 530), one or more meeting services (e.g., meeting service 532), and one or more business communication services (e.g., business communication service 534). In some embodiments, message association service 508 can access services 528, 530, 532, and/or 534 using a single sign-on service (e.g., service 422 of FIG. 4B). Services 528, 530, 532, and/or 534 can be hosted within a cloud computing environment (e.g., cloud computing environment 506 or a different cloud computing environment) or within an on-premises data center (e.g., an on-premises data center of an organization that utilizes message association service 508).

Data collection module 512 may communicate with services 528, 530, 532, 534 using SaaS API modules 516. In more detail, SaaS API modules 516 can include client-side implementations of APIs provided by services 528, 530, 532, 534 to collect or otherwise query/retrieve information regarding messages therefrom. For example, SaaS API modules 516 may include client-side implementations of REST-based APIs provided by JIRA, BASECAMP, and/or TRELLO (e.g., project management service 528) to collect information regarding messages sent/received using JIRA, BASECAMP, and/or TRELLO. As another example, SaaS API modules 516 may include a client-side implementation of a MICROSOFT GRAPH API provided by OUTLOOK (e.g., email service 530) to collect information regarding messages sent/received using OUTLOOK. As still another example, SaaS API modules 516 may include client-side implementations of MICROSOFT GRAPH API provided by TEAMS to collect information regarding messages sent/received using TEAMS, ZOOM API provided by ZOOM to collect information regarding messages sent/received using ZOOM, and/or GOTOMEETING API provided by GOTOMEETING to collect information regarding messages sent/received using GOTOMEETING (e.g., meeting service 532). As yet another example, SaaS API modules 516 may include a client-side implementation of a Web API provided by SLACK (e.g., business communication service 534) to collect information regarding messages sent/received using SLACK. In some embodiments, SaaS API modules 516 may include client-side implementations of Remote Procedure Call (RPC)-based APIs.

The particular services 528, 530, 532, 534 from which data collection module 512 can collect messaging information can vary between different organizations and/or between different users of the same organization. In some embodiments, data collection module 512 can obtain a list of services used by a particular organization and/or user. For example, some organizations serviced by message association service 508 may use JIRA as a project management service 528 whereas other organizations may use TRELLO. As another example, some organizations serviced by message association service 508 may use ZOOM as a meeting service 532 whereas other organizations may use TEAMS. Data collection module 512 can determine which services to collect messaging information from based on configuration information maintained for an organization and/or user. In some embodiments, data collection module 512 may obtain a list of subscribed resources (e.g., applications and services) for a particular user/organization via resource feed service 420 of FIG. 4B. Data collection module 512 may also obtain, for one or more users, authentication credentials (e.g., user ids and passwords, access tokens, etc.) which may be needed to access one of more of the services for collecting messaging information. In some embodiments, data collection module 512 may use a single sign-on service (e.g., service 422 of FIG. 4B) to access one or more such services.

As mentioned previously, data collection module 512 can collect messaging information from services 528, 530, 532, and/or 534. The collected messaging information can include information such as a message sender (e.g., name and/or user id of a user sending the message), a message recipient(s) (e.g., name and/or user id of a user receiving the message), a communication time (e.g., a timestamp indicating when the message was sent/received), a communication start time (e.g., a messaging conversation start timestamp), a communication end time (e.g., a messaging conversation end time), a type of message content (e.g., email content, JIRA content, etc.), a source of the message (e.g., OUTLOOK, JIRA, TEAMS, etc.), a link to the message (e.g., a Uniform Resource Locator (URL) of the message), and other message metadata. These examples of messaging information are merely illustrative and may vary depending on the capabilities of the particular service 528, 530, 532, 534. In some embodiments, data collection module 512 can collect messaging information from services 528, 530, 532, and/or 534 on a continuous basis (e.g., upon a user using any one of services 528, 530, 532, 534 to send a message). In other embodiments, data collection module 512 can collect messaging information from services 528, 530, 532, and/or 534 on a periodic basis (e.g., according to a predetermined schedule such as, for example, every 30 minutes, 1 hour, 2 hours, or any other suitable period of time).

In some embodiments, data collection module 512 can store the messaging information collected from services 528, 530, 532, and/or 534 within data repository 518, where it can subsequently be retrieved and sent to client agents 536 via resource access application 504 and presented to a user using, such as, the illustrative UIs described below in the context of FIGS. 6A, 6B, 7, 8A, 8B. Data repository 518 can correspond to, for example, a storage service within cloud computing environment 506.

In some embodiments, data collection module 512 may distinguish between non-chat-type messages such as, for example, OUTLOOK messages or JIRA messages, and chat-type messages such as, for example, SLACK messages and TEAMS messages, which are exchanged as part of a messaging conversation. For non-chat-type messages, data collection module 512 can store, for a particular message, information indicative of the message sender, the message recipient, the communication time, the type of message content, the source of the message, and the link to the message. In some embodiments, data collection module 512 can also store the messages. For chat-type messages, data collection module 512 can determine whether a messaging conversation that includes a message exceeds a predetermined threshold number of messages, such as, for example, 30 messages, 40 messages, 50 messages, or any other suitable number of messages. If the messaging conversation does not exceed the predetermined threshold number of messages, data collection module 512 can store, for a particular message (i.e., a particular chat-type message), information similar to those described above for a non-chat-type message. If the messaging conversation exceeds the predetermined threshold number of messages, data collection module 512 can store, for a particular messaging conversation, information indicative of the messaging participants (e.g., a sender and a recipient), the communication start time, the communication end time, the type of message content, the source of the messages, one or more keywords, and the link to the messaging conversation. In some embodiments, data collection module 512 can also store the messages. The keywords can be extracted from the messaging information associated with the messages in the messaging conversation (e.g., from the content of the messages in the messaging conversation, etc.) and correspond to relevant topics of the particular messaging conversation. In some embodiments, data collection module 512 can utilize ML module 514 to determine the keywords of a messaging conversation. In some embodiments, data collection module 512 can also store the messages in the messaging conversation.

ML module 514 is operable to determine keywords related to a messaging conversation. In some embodiments, for a particular messaging conversation, ML module 514 can utilize one or more ML algorithms (e.g., Latent Dirichlet Allocation (LDA) or another topic model) to extract keywords from the corresponding messaging information (e.g., from the content of the messages in the messaging conversation, etc.) collected by data collection module 512. The keywords of a particular messaging conversation may be extracted in an intelligent fashion such that the keywords correspond to relevant topics of the messaging conversation rather than simply a list of words found the content of the messages in the messaging conversation. The keywords identified by ML module 514 can be stored with the messaging information of the messaging conversation within data repository 518.

In an illustrative implementation, to extract one or more keywords from the content of messages in a messaging conversation, ML module 514 can generate a preliminary list of keywords by splitting the text in the in the content of the messages on word boundaries, such as spaces, tabs, and punctuation marks. For example, for purposes of this illustration, suppose that the keywords are being extracted from the message "Discuss about automation and CI/CD pipeline in project pacman." Note that a messaging conversation will typically include many messages and that extracting keywords from one message in the messaging conversation is for illustration. Thus, in this example, the preliminary keywords may be: ["Discuss," "about," "automation," "CI/CD," "pipeline," "in," "project," "pacman"]. ML module 514 may then filter the preliminary list of keywords to remove unimportant words (sometimes referred to as "stop words") to produce the extracted keywords (or messaging conversation "topics"). Examples of stop words in English are "a," "the," "is," "are," "in," "about," etc. ML module 514 can utilize one or more lists of stop words to filter the preliminary keywords. For example, ML module 514 may access a default list of stop words such as that provided by the Natural Language Toolkit (NLTK), Gensim, or another open-source project. The default stop word list may be selected based on a language or geographic region associated with the user or the user's organization. In addition, ML model 514 may access one or more custom lists of stop words that includes additional words that are commonly found in messages between users associated with a particular organization. For example, the words "discuss" may be treated as a stop word because it does not provide any information as to a message's or messaging conversation's topic(s). In some embodiments, a particular organization or user can define a custom list of stop words to be used by ML model 514. For example, an organization concerned with project management may define the words "pipeline" and "project" as stop words because they are commonly used jargon within project management. Assuming that the words "discuss," "about," "pipeline," "in," and "project" are treated as stop words, ML model 514 can produce the final list of extracted keywords ["automation," "CI/CD," "pacman"] from the message content "Discuss about automation and CI/CD pipeline in project pacman."

With continued reference to FIG. 5, client agents 536 can include various UI controls to enable a user to receive and/or access information regarding other messages associated with the user and which are relevant to a message associated with the user. The information regarding the other messages associated with the user may serve to provide contextual cues to the message associated with the user. For example, the UI controls can include a control that a user who is viewing a message between the user and another user can activate (e.g., click, tap, or select) to obtain information regarding other messages that are associated with the user and the other user. The other messages that are associated with the user and the other user may be sent via the same application used to send the message that is being viewed and/or via a different application(s). As another example, the UI controls can include a control that a user who is viewing a message between the user and another user can activate to obtain information regarding other messages that are associated with the user and the other user and which are of the same topic as the message that is being viewed by the user. As still another example, the UI controls can include a control that a user can activate to obtain information regarding messages that are associated with the user and each user of a group of users (e.g., between the user and each member of a discussion group). In any case, in response to the user's input, client agent 536 can send a request for information regarding messages associated with the user and the other user to resource access application 504. The request sent to resource access application 504 can include information regarding the user and the other user. Depending on the particular request, the request may also include information regarding a message associated with the user and the other user (e.g., a topic of the message associated with the user and the other user, etc.). In response to the request, resource access application 504 can send a message to message association service 508 requesting the information regarding messages associated with the user and the other user. In response to the message from resource access application 504, message association service 508 can retrieve the requested information (e.g. information regarding the user and the other user) from data repository 518. Message association service 508 can then send the requested information regarding messages associated with the user and the other user to resource access application which, in turn, sends the requested information to client agent 536. Upon receiving the information regarding messages associated with the user and the other user, client agent 536 can render the received information and send the rendered information to its associated application (e.g., application 520, 522, 524, or 526) for rendering on a display of a computing device (e.g., client device 502).

Figure 6A:
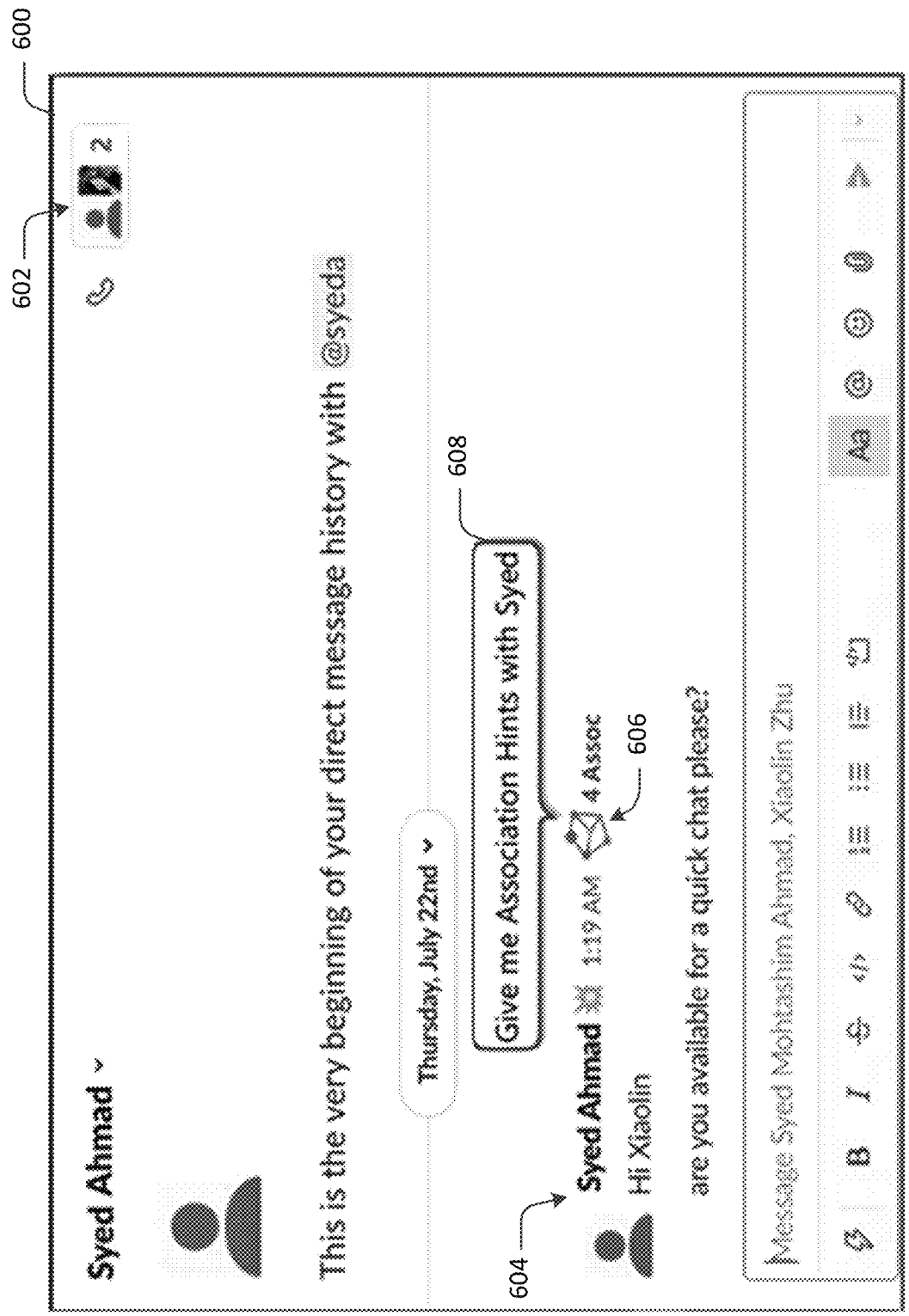
FIGS. 6A and 6B show an example of a user interface (UI) that may be used to present information regarding other messages associated with a user that are relevant to a message associated with the user, in accordance with an embodiment of the present disclosure.
Figure 6B:
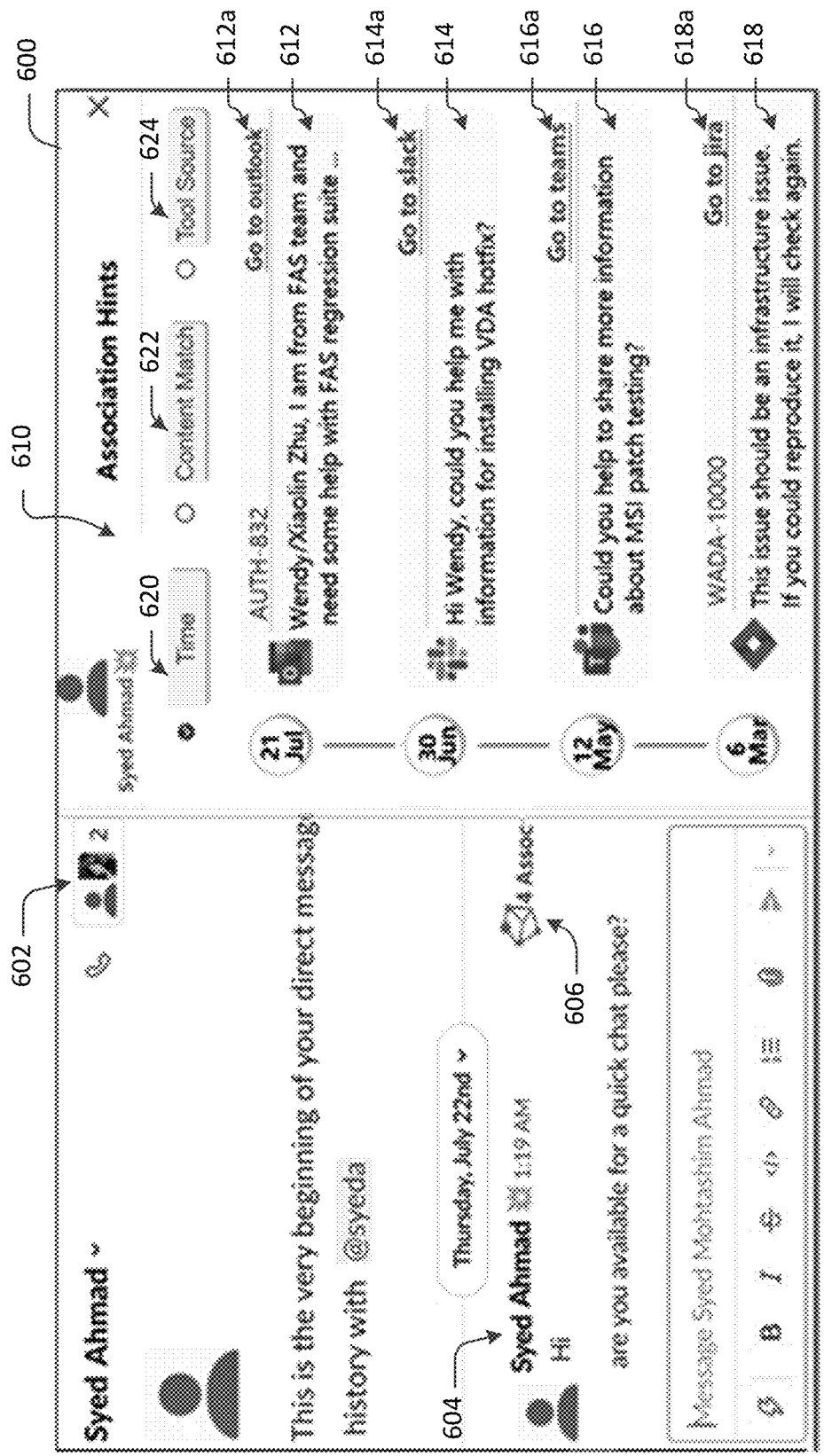

FIGS. 6A and 6B show an example of a user interface (UI) 600 that may be used to present information regarding other messages associated with a user that are relevant to a message associated with the user, in accordance with an embodiment of the present disclosure. UI 600 may be implemented within an application that provides messaging functionality, such as project management application 520, email application 522, meeting application 524, and business communication application 526 of FIG. 5, or other suitable messaging application. In the example of FIGS. 6A and 6B and in the following description thereof, it is assumed that UI 600 is implemented within a SLACK client application, and that a user named "Xiaolin" (also known as "Wendy") is logged into the SLACK application, as indicated by an icon 602.

Referring to FIG. 6A, UI 600 may be presented to a user (e.g., Xiaolin) to allow the user to view SLACK messages associated with the user. For example, as indicated by reference numeral 604, the user may be viewing a SLACK message from another user named "Syed." An icon 606 may be presented next to message 604. The user can hover over icon 606 using a mouse or other pointing device to display a text box 608 that displays an infotip or hint regarding message 604. For example, as can be seen in FIG. 6A, text box 608 may inform the user that information regarding other messages associated with the user and the other user named "Syed" is available ("Give me Association Hints with Syed"). In this example, the user may be unsure of what Syed is asking by message 604 ("are you available for a quick chat please?") and may want to receive information regarding the user's other messages with Syed. To do so, the user can activate (e.g., click, tap, or select) icon 606 to obtain the information regarding other messages associated with the user and the other user named "Syed" (e.g., information regarding Xiaolin's other messages with Syed).

In response to the user activating icon 606, UI 600 can cause a request to be sent to a message association service (e.g., message association service 508 of FIG. 5) to obtain information regarding Xiaolin's other messages with Syed. In some implementations, the request to the message association service may be sent via a resource access application (e.g., resource access application 504 of FIG. 5). The request may include a unique identifier of Xiaolin and a unique identifier of Syed which the data processing service can use to identify other messages associated with Xiaolin and Syed from a data repository storing such information (e.g., data repository 518 of FIG. 5). In some implementations, the request may include other metadata of message 604 such as, for example, the content of message 604, a summary of message 604, and a source of message 604 (e.g., SLACK). The message association service can use the information included with the request (e.g., metadata of message 604) to identify other messages associated with Xiaolin and Syed. The message association service can send the information regarding other messages associated with Xiaolin and Syed to the resource access application. The resource access application can then send the information provided by message association service to the SLACK client application.

Turning to FIG. 6B, in response to the information regarding other messages associated with Xiaolin and Syed being received, the SLACK client application can render the information and present the rendered information in UI 600. For example, the SLACK client application can display the rendered information in a pane 610. As shown in pane 610, items 612, 614, 616, 618 may be presented as the information regarding other messages associated with Xiaolin and Syed. Item 612 is associated with an OUTLOOK message, item 614 is associated with a SLACK message, item 616 is associated with a TEAMS message, and item 618 is associated with a JIRA message. In the example of FIG. 6B, as indicated by the selected "Time" button 620, items 612, 614, 616, 618 are ordered based on chronology (i.e., based on a timeline of the messages associated with items 612, 614, 616, 618). As shown in pane 610, item 612 is associated with the most recent message (dated "21 Jul"), item 614 is associated with the second most recent message (dated "30 Jun"), item 616 is associated with the third most recent message (dated "12 May"), and item 616 is associated with the fourth most recent message (dated "6 Mar"). As also shown in pane 610, each item 612, 614, 616, 618 includes a link (e.g., a link 612a, a link 614a, a link 616a, and a link 618a) to an application that can be used to view the message associated with item 612, 614, 616, 618. For example, the user can activate link 612a to view the message associated with item 612 in OUTLOOK. Similarly, the user can activate link 618a to view the message associated with item 618 in JIRA.

Still referring to FIG. 6B, pane 610 may also include a "Content Match" button 622 and a "Tool Source" button 624. When a user selects "Content Match" button 622, items 612, 614, 616, 618 displayed in pane 610 may be ordered based on a match of the contents of the messages associated with items 612, 614, 616, 618 and the contents of message 604. For example, if message 604 has a particular topic, items 612, 614, 616, 618 may be ordered based on a match of the contents of the messages associated with items 612, 614, 616, 618 and the topic of message 604. When a user selects "Tool Source" button 624, items 612, 614, 616, 618 displayed in pane 610 may be ordered based an application where the information regarding the message associated with the individual items 612, 614, 616, 618 was collected from. The ordering of the applications may be configurable by the organization and/or the user. For example, suppose that the organization configured the order to be SLACK, JIRA, TEAMS, and OUTLOOK. Then, based on this configured ordering, when the user selects "Tool Source" button 624, pane 610 may display the items in the order item 614, item 618, item 616, and then item 612.

Figure 7:
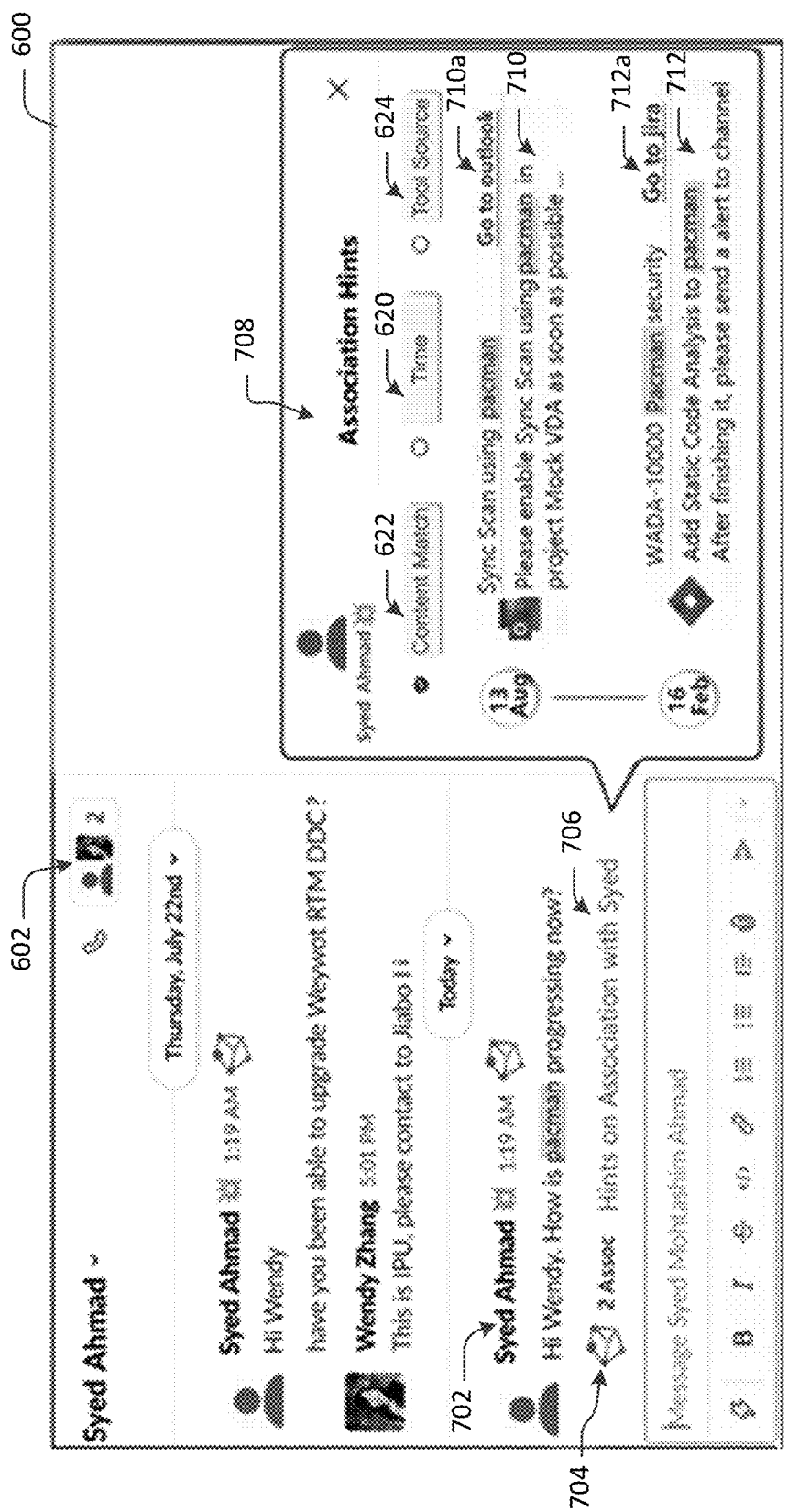
FIG. 7 shows an example of the user interface (UI) of FIGS. 6A and 6B that may be used to present information regarding other messages associated with a user that are relevant and of a same topic as a message associated with the user, in accordance with an embodiment of the present disclosure.

FIG. 7 shows an example of user interface (UI) 600 that may be used to present information regarding other messages associated with a user that are relevant and of a same topic as a message associated with the user, in accordance with an embodiment of the present disclosure. In FIG. 7, like elements of FIGS. 6A and 6B are shown using like reference designators and, unless context dictates otherwise, may not be described again for purposes of clarity. In the example of FIG. 7 and in the following description thereof, it is assumed that UI 600 is implemented within a SLACK client application, and that a user named "Xiaolin" (also known as "Wendy") is logged into the SLACK application, as indicated by an icon 602.

Referring to FIG. 7, UI 600 may be presented to a user (e.g., Xiaolin) to allow the user to view SLACK messages associated with the user. For example, as indicated by reference numeral 702, the user may be viewing a SLACK message from another user named "Syed." An icon 704 may be presented below message 702. The user can hover over icon 704 using a mouse or other pointing device to display an infotip or hint 706 regarding message 702. For example, as can be seen in FIG. 7, infotip 706 may inform the user that information regarding other messages associated with the user and the other user named "Syed" and which are of the same topic as message 702 is available ("Hints on Association with Syed"). In this example, message 702 may be the first SLACK message regarding the topic discussed in message 702 (e.g., regarding the topic "pacman"), and the user may want to receive information regarding the user's other messages with Syed that discuss the same topic (e.g., the topic "pacman"). To do so, the user can activate (e.g., click, tap, or select) icon 704 to obtain the information regarding other messages associated with the user and the other user named "Syed" and which are of the same topic as message 702 (e.g., information regarding Xiaolin's other messages with Syed discussing the topic "pacman").

In response to the user activating icon 704, UI 600 can cause a request to be sent to a message association service (e.g., message association service 508 of FIG. 5) to obtain information regarding Xiaolin's other messages with Syed discussing the topic "pacman." In some implementations, the request to the message association service may be sent via a resource access application (e.g., resource access application 504 of FIG. 5). The request may include a unique identifier of Xiaolin, a unique identifier of Syed, and the topic "pacman" which the data processing service can use to identify other messages associated with Xiaolin and Syed that are discussing "pacman" from a data repository storing such information (e.g., data repository 518 of FIG. 5). In some implementations, the request may include other metadata of message 702 such as, for example, the content of message 702, a summary of message 702, and a source of message 702 (e.g., SLACK). The message association service can use the information included with the request (e.g., metadata of message 702) to identify other messages associated with Xiaolin and Syed that are discussing "pacman." The message association service can send the information regarding other messages associated with Xiaolin and Syed discussing "pacman" to the resource access application. The resource access application can then send the information provided by message association service to the SLACK client application.

In response to the information regarding other messages associated with Xiaolin and Syed discussing "pacman" being received, the SLACK client application can render the information and present the rendered information in UI 600. For example, the SLACK client application can display the rendered information in a popup window 708. As shown in window 708, items 710, 712 may be presented as the information regarding other messages associated with Xiaolin and Syed that are discussing "pacman." Item 710 is associated with an OUTLOOK message dated "13 Aug" and item 712 is associated with a JIRA message dated "16 Feb" As shown in window 708, item 710 includes a link 710a to an application that can be used to view the message associated with item 710 and item 712 includes a link 712a to an application that can be used to view the message associated with item 712. For example, the user can activate link 710a to view the message associated with item 710 in OUTLOOK. Similarly, the user can activate link 712a to view the message associated with item 712 in JIRA.

Figure 8A:
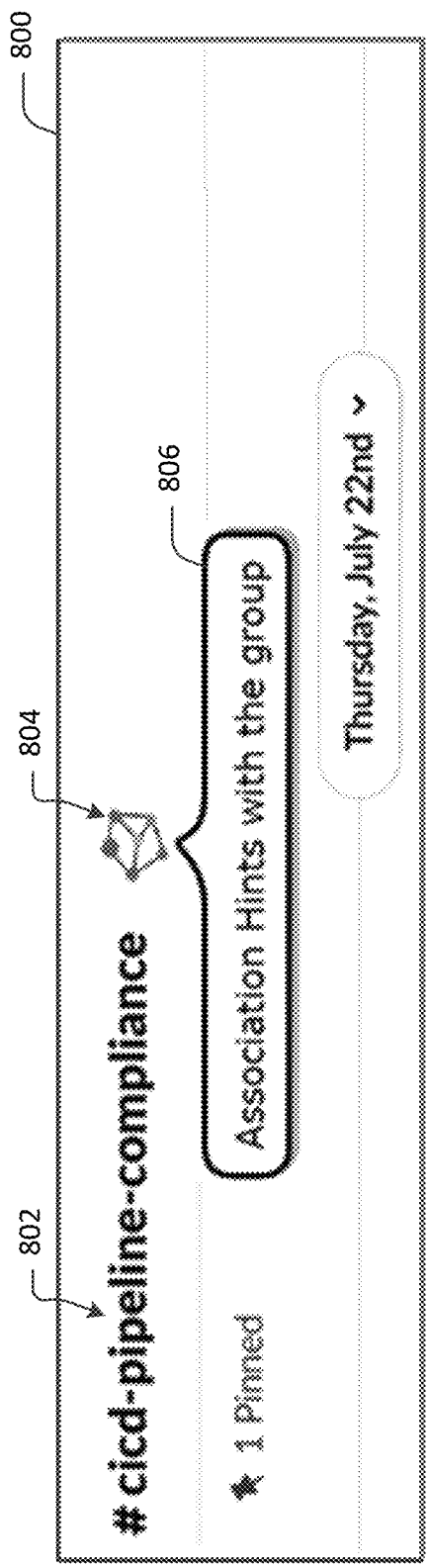
FIGS. 8A and 8B show an example of a user interface (UI) that may be used to present information indicative of associations between a user and members of a group, in accordance with an embodiment of the present disclosure.
Figure 8B:
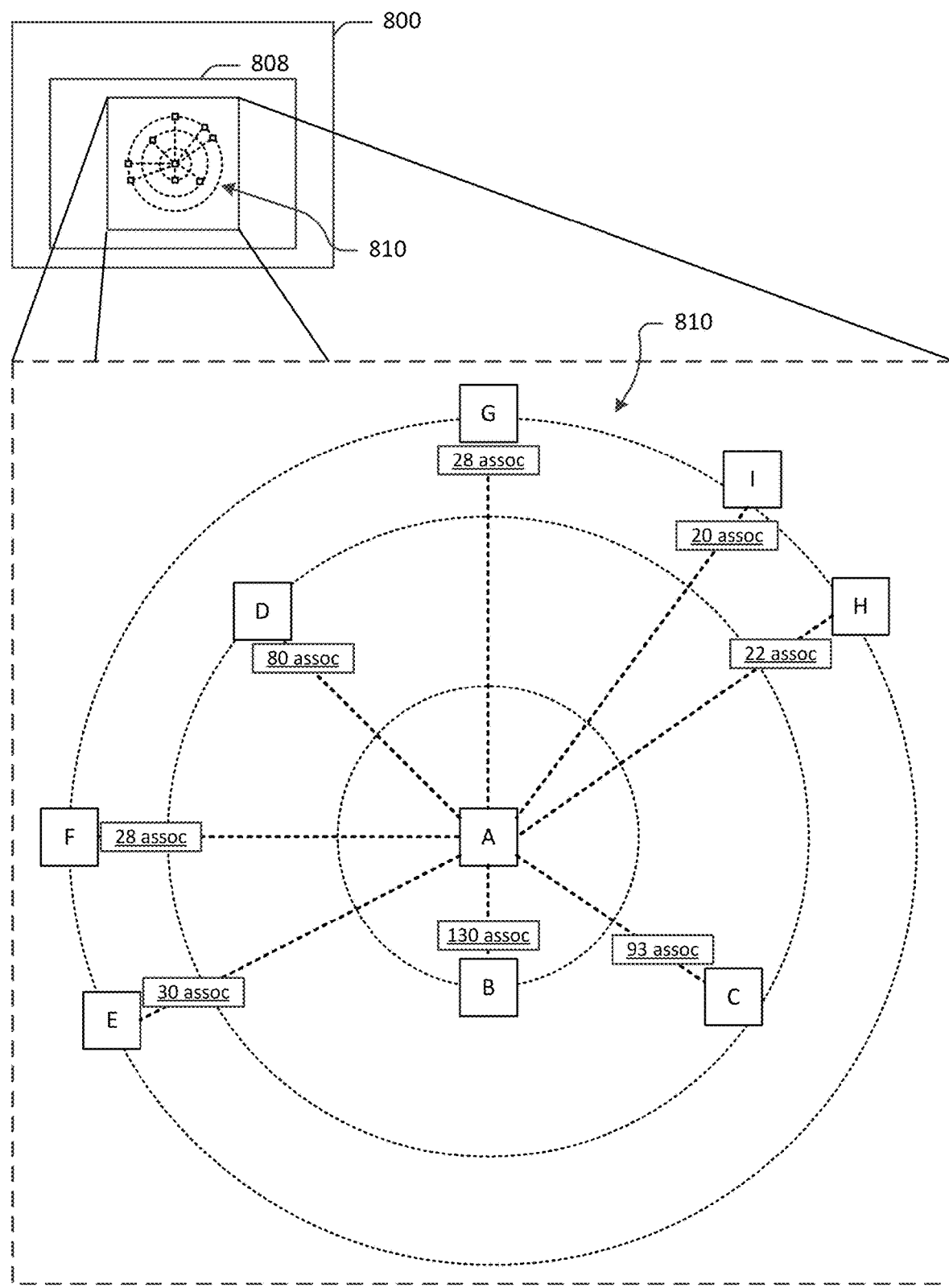

FIGS. 8A and 8B show an example of a user interface (UI) that may be used to present information indicative of associations between a user and members of a group, in accordance with an embodiment of the present disclosure. UI 800 may be implemented within an application that provides discussion group functionality, such as project management application 520, email application 522, meeting application 524, and business communication application 526 of FIG. 5, or other suitable collaboration application. In the example of FIGS. 8A and 8B and in the following description thereof, it is assumed that UI 800 is implemented within a SLACK client application, and that a User A is logged into the SLACK application.

Referring to FIG. 8A, UI 800 may be presented to a user (e.g., User A) to allow the user to obtain information regarding the extent of communications or messages (or "associations") exchanged between User A and the individual members of a discussion group titled "# cicd-pipeline-compliance" (e.g., a SLACK channel titled "# cicd-pipeline-compliance"), as indicated by reference numeral 802. An icon 804 may be presented next to the name of the discussion group. The user can hover over icon 804 using a mouse or other pointing device to display a text box 806 that displays an infotip or hint informing the user that information regarding the extent of User A's communications with the individual members of the discussion group titled "# cicd-pipeline-compliance" (e.g., information regarding the number of messages exchanged between User A and the individual members of the discussion group titled "# cicd-pipeline-compliance") is available ("Association hints with the group"). For the purposes of this example, it is assumed that the discussion group titled "# cicd-pipeline-compliance" is composed of a User B, User C, User D, User E, User F, User G, User H, and User I. To obtain information regarding the extent of User A's communications with the individual members of the discussion group titled "# cicd-pipeline-compliance," the user can activate (e.g., click, tap, or select) icon 804.

In response to the user activating icon 804, UI 800 can cause a request to be sent to a message association service (e.g., message association service 508 of FIG. 5) to obtain information regarding the extent of User A's communications with the individual members of a discussion group titled "# cicd-pipeline-compliance." In some implementations, the request to the message association service may be sent via a resource access application (e.g., resource access application 504 of FIG. 5). The request may include a unique identifier of User A and a unique identifier of the discussion group which the data processing service can use to identify the messages associated with User A and the individual members of the discussion group titled "# cicd-pipeline-compliance" (e.g., User B, User C, User D, User E, User F, User G, User H, and User I) from a data repository storing such information (e.g., data repository 518 of FIG. 5). Based on the identified messages, the message association service can determine the number of messages exchanged between User A and the individual members of the discussion group titled "# cicd-pipeline-compliance." The message association service can send the information regarding the number of messages exchanged between User A and the individual members of the discussion group titled "# cicd-pipeline-compliance" to the resource access application. The resource access application can then send the information provided by message association service to the SLACK client application.

Turning to FIG. 8B, in response to the information regarding the number of messages exchanged between User A and the individual members of the discussion group titled "# cicd-pipeline-compliance" (e.g., information regarding the number of messages associated with User A and the individual members of the discussion group titled "# cicd-pipeline-compliance") being received, the SLACK client application can render the information and present the rendered information in UI 800. For example, the SLACK application can display the rendered information in a pane 808. As shown in pane 808, in an illustrative implementation, the information regarding the number of messages exchanged between User A and the individual members of the discussion group titled "# cicd-pipeline-compliance" (e.g., information regarding the number of messages associated with User A and each of User B, User C, User D, User E, User F, User G, User H, and User I) may be shown pictorially in which the member of the discussion group with the larger number of messages exchanged with User A is shown closer to User A. For example, as indicated by a picture 810 displayed in pane 808, User A and User B may have exchanged 130 messages as indicated by the text "130 assoc", User A and User C may have exchanged 93 messages as indicated by the text "93 assoc", User A and User D may have exchanged 80 messages as indicated by the text "80 assoc", User A and User E may have exchanged 30 messages as indicated by the text "30 assoc", User A and User F may have exchanged 28 messages as indicated by the text "28 assoc", User A and User G may have exchanged 28 messages as indicated by the text "28 assoc", User A and User H may have exchanged 22 messages as indicated by the text "22 assoc", and User A and User I may have exchanged 20 messages as indicated by the text "20 assoc". Thus, from the displayed picture 810, the user is able to readily determine the extent of User A's communications with each member of the discussion group titled "# cicd-pipeline-compliance." This information may, for example, allow the user to identify a member of the discussion group titled "# cicd-pipeline-compliance" for receiving an inquiry from the user.

Figure 9:
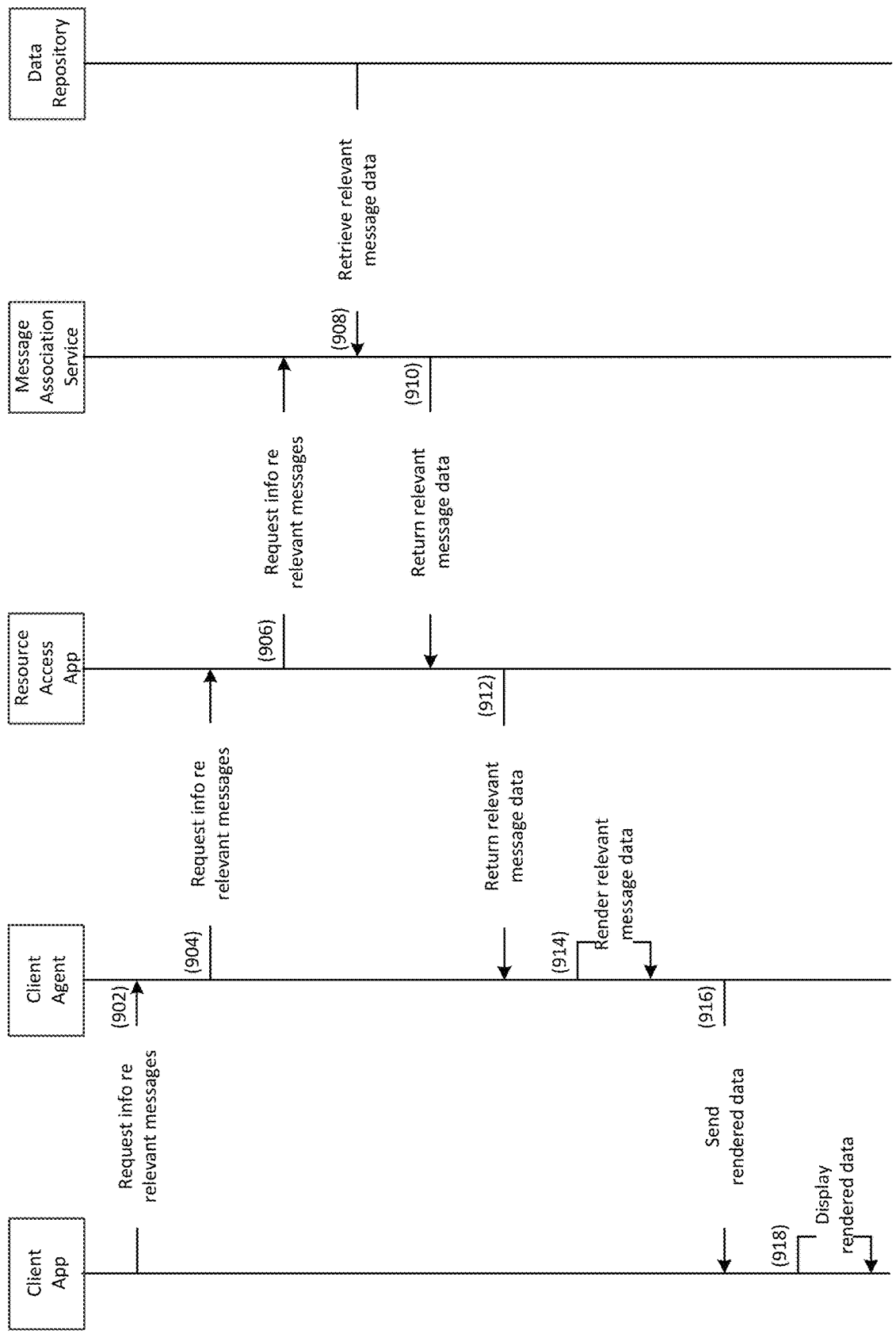
FIG. 9 is a sequence diagram showing an example flow of interactions between various components to present information regarding messages that are relevant to a message associated with a user, in accordance with an embodiment of the present disclosure.

FIG. 9 is a sequence diagram showing an example flow of interactions between various components to present information regarding messages that are relevant to a message associated with a user, in accordance with an embodiment of the present disclosure. For example, the interactions may be between various components of message association service 508 in response to message association service 508 receiving a request for information regarding messages associated with a user from resource access application 504 (e.g., in response to a user activating icon 606 of FIG. 6A, to a user activating icon 704 of FIG. 7, to a user activating icon 804 of FIG. 8, or another input or event).

At 902, client agent 536 on a client device 502 receives a request for information regarding relevant messages. The request may be received from an application (e.g., application 520, 522, 524, or 526) on client device 502 being used by a user. For example, the relevant messages may be messages that are associated with the user and another user. As another example, the relevant messages may be messages that are associated with the user and another user and which are of a specific topic. As still another example, the relevant messages may be messages between the user and individual members of a discussion group.

In response to the request for information regarding relevant messages being received, at 904, client agent 536 sends a request for the requested information regarding relevant messages to resource access application 504 on client device 502. For example, client agent 536 can forward the received request to resource access application 504.

In response to the request for information regarding relevant messages being received, at 906, resource access application 504 sends a request for the requested information regarding relevant messages to message association service 508.

In response to the request for information regarding relevant messages being received, at 908, message association service 508 retrieves the requested information (e.g., retrieves the relevant message data) from data repository 518. For example, the relevant message data may be retrieved based on metadata and other information included with the received request, as previously described herein.

Upon retrieving the relevant message data, at 910, message association service 508 sends the relevant message data to resource access application 504 on client device 502.

In response to the relevant message data being received, at 912, resource access application 504 send the relevant message data to client agent 536. The received relevant message data is in response to the request for information regarding relevant messages sent by client agent 536, Upon receiving the relevant message data, at 914, client agent 536 renders the relevant message data for display and, at 916, sends the rendered data to the application (e.g., application 520, 522, 524, or 526) on client device 502. This application is the application that the user used to request the information regarding the relevant messages.

In response to the rendered data being received, at 918, the application displays the rendered data on a screen of client device 502. The user can then view and/or interact with the information regarding the relevant messages displayed on client device 502.

Further Example Embodiments

The following examples pertain to further embodiments, from which numerous permutations and configurations will be apparent.

Example 1 includes a method including: responsive to a request for information regarding messages associated with a user and another user: identifying, by a computing device, a message associated with the user and the another user, the message sent or received via an application from a plurality of applications; identifying, by the computing device, one or more other messages associated with the user and the another user based on metadata of the message, at least one of the one or more other messages sent or received via another application of the plurality of applications, the another application being different than the application; and outputting, by the computing device, information regarding the one or more other messages.

Example 2 includes the subject matter of Example 1, wherein the one or more other messages includes a message sent or received via the application.

Example 3 includes the subject matter of any of Examples 1 and 2, wherein the message has a topic and the one or more other messages includes a message having a common topic as the topic of the message.

Example 4 includes the subject matter of any of Examples 1 through 3, wherein the one or more other messages are sent or received within a specified duration of the message.

Example 5 includes the subject matter of any of Examples 1 through 4, wherein one of the one or more other messages is a chat message, and the information regarding the one or more other messages includes one or more keywords associated with the chat message.

Example 6 includes the subject matter of any of Examples 1 through 5, wherein the outputting includes ordering the one or more other messages based on a timeline.

Example 7 includes the subject matter of any of Examples 1 through 6, wherein the outputting includes ordering the one or more other messages based on the application used to send or receive the one or more other messages.

Example 8 includes the subject matter of any of Examples 1 through 7, wherein the outputting includes ordering the one or more other messages based on content of the one or more other messages.

Example 9 includes the subject matter of any of Examples 1 through 8, wherein the another user is a plurality of recipients, the method further includes: determining a number of messages associated with the user and each recipient of the plurality of recipients; and outputting, by the computing device, information indicative of the number of messages associated with the user and each recipient of the plurality of recipients.

Example 10 includes a system including a processor and a non-volatile memory storing computer program code that when executed on the processor causes the processor to execute a process operable to: responsive to a request for information regarding messages associated with a user and another user: identify a message associated with the user and the another user, the message sent or received via an application from a plurality of applications; identify one or more other messages associated with the user and the another user based on metadata of the message, at least one of the one or more other messages sent or received via another application of the plurality of applications, the another application being different than the application; and output information regarding the one or more other messages.

Example 11 includes the subject matter of Example 10, wherein the one or more other messages includes a message sent or received via the application.

Example 12 includes the subject matter of any of Examples 10 and 11, wherein the message has a topic and the one or more other messages includes a message having a common topic as the topic of the message.

Example 13 includes the subject matter of any of Examples 10 through 12, wherein the one or more other messages are sent or received within a specified duration of the message.

Example 14 includes the subject matter of any of Examples 10 through 13, wherein one of the one or more other messages is a chat message, and the information regarding the one or more other messages includes one or more keywords associated with the chat message.

Example 15 includes the subject matter of any of Examples 10 through 14, wherein to output information regarding the one or more other messages includes to order the one or more other messages based on a timeline.

Example 16 includes the subject matter of any of Examples 10 through 15, wherein to output information regarding the one or more other messages includes to order the one or more other messages based on the application used to send or receive the one or more other messages.

Example 17 includes the subject matter of any of Examples 10 through 16, wherein to output information regarding the one or more other messages includes to order the one or more other messages based on content of the one or more other messages.

Example 18 includes the subject matter of any of Examples 10 through 17, wherein the another user is a plurality of recipients, and wherein the process is further operable to: determine a number of messages associated with the user and each recipient of the plurality of recipients; and output information indicative of the number of messages associated with the user and each recipient of the plurality of recipients.

Example 19 includes a method including: receiving, by a first computing device, information regarding a message associated with a user, the message sent or received via an application from a plurality of applications; identifying, by the first computing device, one or more other messages associated with the user and that are relevant to the message, at least one of the one or more other messages sent or received via another application of the plurality of applications, the another application being different than the application; and sending, by the first computing device, information regarding the one or more other messages associated with the user and that are relevant to the message to a second computing device, the second computing device configured to display the information regarding the one or more other messages associated with the user and that are relevant to the message.

Example 20 includes the subject matter of Example 19, wherein receiving information regarding the message includes receiving information regarding a sender of the message, and wherein the one or more other messages includes a message associated with the sender of the message.

Example 21 includes the subject matter of any of Examples 19 and 20, wherein receiving information regarding the message includes receiving information regarding a topic of the message, and wherein the one or more other messages includes a message having a common topic as the topic of the message.

Example 22 includes the subject matter of any of Examples 19 through 21, wherein receiving information regarding the message includes receiving information regarding a plurality of recipients of the message, the method further including: determining, by the first computing device, a number of messages associated with the user and each recipient of the plurality of recipients; and sending, by the first computing device, information indicative of the number of messages associated with the user and each recipient of the plurality of recipients to the second computing device, the second computing device configured to display the information indicative of the number of messages associated with the user and each recipient of the plurality of recipients.

Example 23 includes the subject matter of any of Examples 19 through 22, wherein one of the one or more other messages is a chat message, and the information regarding the one or more other messages includes one or more keywords associated with the chat message.

Example 24 includes a system including a processor and a non-volatile memory storing computer program code that when executed on the processor causes the processor to execute a process operable to: receive, by a first computing device, information regarding a message associated with a user, the message sent or received via an application from a plurality of applications; identify, by the first computing device, one or more other messages associated with the user and that are relevant to the message, at least one of the one or more other messages sent or received via another application of the plurality of applications, the another application being different than the application; and send, by the first computing device, information regarding the one or more other messages associated with the user and that are relevant to the message to a second computing device, the second computing device configured to display the information regarding the one or more other messages associated with the user and that are relevant to the message.

Example 25 includes the subject matter of Example 24, wherein to receive information regarding the message includes to receive information regarding a sender of the message, and wherein the one or more other messages includes a message associated with the sender of the message.

Example 26 includes the subject matter of any of Examples 24 and 25, wherein to receive information regarding the message includes to receive information regarding a topic of the message, and wherein the one or more other messages includes a message having a common topic as the topic of the message.

Example 27 includes the subject matter of any of Examples 24 through 26, wherein to receive information regarding the message includes to receive information regarding a plurality of recipients of the message, and wherein the process is further operable to: determine, by the first computing device, a number of messages associated with the user and each recipient of the plurality of recipients; and send, by the first computing device, information indicative of the number of messages associated with the user and each recipient of the plurality of recipients to the second computing device, the second computing device configured to display the information indicative of the number of messages associated with the user and each recipient of the plurality of recipients.

Example 28 includes the subject matter of any of Examples 24 through 27, wherein one of the one or more other messages is a chat message, and the information regarding the one or more other messages includes one or more keywords associated with the chat message.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
   responsive to a request for information regarding messages associated with a user and another user, wherein the request includes metadata of a message from the another user to the user, the message sent or received via a project management application:
   identifying, by a computing device, one or more other messages associated with the user and the another user based on the metadata included with the request, at least one of the one or more other messages sent or received via another application different than the project management application, wherein the message has a topic and the one or more other messages includes a message having a common topic as the topic of the message, and wherein the one or more other messages are sent or received within a specified duration of the message; and
   sending, by the computing device to another computing device, information regarding the one or more other messages, the another computing device configured to display the information regarding the one or more messages within a resource access application providing access to both the project management application and the another application.

2. The method of claim 1, wherein the one or more other messages includes a message sent or received via the project management application.

3. The method of claim 1, wherein one of the one or more other messages is a chat message, and the information regarding the one or more other messages includes one or more keywords associated with the chat message.

4. The method of claim 1, wherein the rendering includes ordering the one or more other messages based on a timeline.

5. The method of claim 1, wherein the rendering includes ordering the one or more other messages based on the application used to send or receive the one or more other messages.

6. The method of claim 1, wherein the rendering includes ordering the one or more other messages based on content of the one or more other messages.

7. The method of claim 1, wherein the another user is a plurality of recipients, the method further comprising:
determining a number of messages associated with the user and each recipient of the plurality of recipients; and
outputting, by the computing device, information indicative of the number of messages associated with the user and each recipient of the plurality of recipients.

8. A system comprising:
a processor; and
a non-volatile memory storing computer program code that when executed on the processor causes the processor to execute a process operable to:
responsive to a request for information regarding messages associated with a user and another user, wherein the request includes metadata of a message from the another user to the user, the message sent or received via a project management application:
identify one or more other messages associated with the user and the another user based on the metadata included with the request, at least one of the one or more other messages sent or received via another application different than the project management application, wherein the message has a topic and the one or more other messages includes a message having a common topic as the topic of the message, and wherein the one or more other messages are sent or received within a specified duration of the message; and
send to a computing device information regarding the one or more other messages, the computing device configured to display the information regarding the one or more messages within a resource access application providing access to both the project management application and the another application.

9. The system of claim 8, wherein the one or more other messages includes a message sent or received via the project management application.

10. The system of claim 8, wherein the another user is a plurality of recipients, and wherein the process is further operable to:
determine a number of messages associated with the user and each recipient of the plurality of recipients; and
output information indicative of the number of messages associated with the user and each recipient of the plurality of recipients.

11. A method comprising:
receiving, by a first computing device, information regarding a message associated with a user, the message sent or received via a project management application from a plurality of applications;
identifying, by the first computing device, one or more other messages associated with the user and that are relevant to the message based on information regarding the message, at least one of the one or more other messages sent or received via another application of the plurality of applications, the another application being different than the project management application, wherein the message has a topic and the one or more other messages includes a message having a common topic as the topic of the message, and wherein the one or more other messages are sent or received within a specified duration of the message; and
sending, by the first computing device, information regarding the one or more other messages associated with the user and that are relevant to the message to a second computing device, the second computing device configured to display the information regarding the one or more other messages associated with the user and that are relevant to the message within a resource access application providing access to both the project management application and the another application.

12. The method of claim 11, wherein receiving information regarding the message includes receiving information regarding a sender of the message, and wherein the one or more other messages includes a message associated with the sender of the message.

13. The method of claim 11, wherein receiving information regarding the message includes receiving information regarding a plurality of recipients of the message, the method further comprising:
determining, by the first computing device, a number of messages associated with the user and each recipient of the plurality of recipients; and
sending, by the first computing device, information indicative of the number of messages associated with the user and each recipient of the plurality of recipients to the second computing device, the second computing device configured to display the information indicative of the number of messages associated with the user and each recipient of the plurality of recipients.

14. The method of claim 11, wherein one of the one or more other messages is a chat message, and the information regarding the one or more other messages includes one or more keywords associated with the chat message.

* * * * *